US006639571B2

United States Patent
Wang

(10) Patent No.: US 6,639,571 B2
(45) Date of Patent: Oct. 28, 2003

(54) ROTATING DISPLAY WITH DESIGN OF SURROUNDING A COLUMN

(75) Inventor: Frank Wang, Hsin-Chuang (TW)

(73) Assignee: Dynascan Technology Corp., Taipei Hsien (TW)

( * ) Notice: Subject to any disclaimer, the term of this patent is extended or adjusted under 35 U.S.C. 154(b) by 216 days.

(21) Appl. No.: 09/963,583

(22) Filed: Sep. 27, 2001

(65) Prior Publication Data

US 2003/0058201 A1 Mar. 27, 2003

(51) Int. Cl.[7] .................................. G09G 3/00
(52) U.S. Cl. ............................. 345/31; 345/108
(58) Field of Search ............................. 345/31, 46, 82, 345/108, 110, 111

(56) References Cited

U.S. PATENT DOCUMENTS

| | | | | |
|---|---|---|---|---|
| 4,160,973 A | * | 7/1979 | Berlin, Jr. ..................... | 345/31 |
| 4,689,604 A | * | 8/1987 | Sokol ........................... | 345/31 |
| 4,706,398 A | * | 11/1987 | Browne et al. ................ | 40/449 |
| 5,302,965 A | * | 4/1994 | Belcher et al. ................ | 345/31 |
| 5,485,043 A | * | 1/1996 | Wakatake et al. ......... | 310/49 R |
| 5,818,401 A | | 10/1998 | Wang | |
| 6,278,419 B1 | * | 8/2001 | Malkin ......................... | 345/31 |
| 6,335,714 B1 | * | 1/2002 | Wang ........................... | 345/82 |
| 6,577,286 B1 | * | 6/2003 | Jang ............................. | 345/31 |

* cited by examiner

Primary Examiner—Kent Chang
(74) Attorney, Agent, or Firm—Rabin & Berdo, P.C.

(57) ABSTRACT

A rotating display to present images includes a transmission/support mechanism installed on a column of a building, an annular display unit installed around the column, supported and driven by the transmission/support mechanism, a contact power supply unit installed on the column, a control unit provided inside the display unit, and an angle encoding unit between the column and the display unit. Using the foregoing elements, a rotating display can be formed on a column of a building. Image signals are transmitted wirelessly to the control unit to light up the light-emitting modules on the display unit. Due to the visual persistence in human vision, a 360-degree panoramic image can be produced, thus decorating the building column or playing commercials.

8 Claims, 6 Drawing Sheets

ROTATING DISPLAY WITH DESIGN OF SURROUNDING A COLUMN

BACKGROUND OF THE INVENTION

1. Field of Invention

The invention relates to a rotating display, and more particularly to a rotating display with design of surrounding a column, wherein the displays are installed on a column so as to produce a 360-degree panoramic image.

2. Related Art

LEDs (often hundreds of thousands of LEDs) are used in a large conventional display. More LEDs are needed for higher resolution display. The increased number of LEDs not only increases the cost but also increases the probability that the display will have faulty elements. To solve the problem, the inventor submitted R.O.C. Pat. Application No. 85,202,605 entitled "Spacetime-Dividing Rotational Electronic Display", U.S. Pat. No. 5,818,401 and P.R.C. Pat. No. ZL96229136. In the Pats. Application, several lines of light-emitting units are mounted at equal distances or equal angular distances on a rotator. The light-emitting units on each line are composed of many light-emitting sources. When the rotator rotates, different light-emitting sources on each of the light-emitting units are energized at different spatial points. Due to the visual persistence of images in the human eye, a virtual display is formed on the rotating surface of the rotator.

Since the foregoing applications significantly decrease the number of LEDs needed and consequently lowers the probability of faulty element, the foregoing applications were granted bearing R.O.C. Pat. No. 120,003, U.S. Pat. No. 5,818,401 and P.R.C. Pat No. 96229136.

From the foregoing description, one can see that by dividing spacetime and utilizing the visual persistence of the human eye, only a relatively few light-emitting units are needed on a rotator to form a virtual display. However, the existing rotating display can only be used as an independent device. Large conventional flat displays are mounted on walls of a big building to display images. If the rotating display can be similarly installed around the column of building, then its applications can be expanded widely.

SUMMARY OF THE INVENTION

Therefore, an objective of the invention is to provide a rotating display that can be installed on any kind of column to produce a 360-degree panoramic image. With such a design, mounting a rotating display on a high building column can be used as decoration and for advertising or information display.

To achieve the foregoing objective, the rotating display in accordance with the present invention includes: a transmission/support mechanism, an annular display unit, a contact power supply unit, a control unit and an angle encoding unit. The transmission/support mechanism is installed on a column of a building. The annular display unit is installed around the column and is supported and driven by the transmission/support mechanism. The contact power supply unit is installed on the column. The control unit is provided inside the display unit. The angle encoding unit is between the column and the display unit.

Image signals are transmitted wirelessly to the control unit to light up the light-emitting units on the display unit. Due to the visual persistence of images in the human eye, a 360-degree panoramic image can be produced. The rotating display structure is modularized so that the display can be easily installed.

The transmission/support mechanism consists of at least three motors. Each of the motors is attached to the column with its shaft pointing out radially from the column and a driving wheel attached to the end of the shaft. The driving wheels support the display unit. When the motors operate, the driving wheels rotate the display unit.

The display unit comprises several sets of light-emitting modules, an upper conducting ring and a lower conducting ring. The light-emitting modules are installed vertically at equal angles between the upper conducting ring and the lower conducting ring. The upper conducting ring and the lower conducting ring are electrically connected to the contact power supply unit so that positive and negative power are provided through the upper conducting ring and the lower conducting ring, respectively. The light-emitting module is comprised of a long vertical strip with LED's (Light-Emitting Diode) or equivalent light source devices installed in a line along the strip. Each LED is installed inside the strip, and an electrical circuit is formed between each LED and the upper conducting ring and the lower conducting ring. A signal circuit is also formed between each LED and the control unit.

The upper and lower conducting rings are composed of several arcuate sections so the conducting rings can be conveniently installed around a column. The contact power supply unit has one or more than one electric brush modules around the top portion and bottom portion of the column. Each electric brush module has a conducting shell filled with mercury or a carbon brush. The electric brush module connects to one pole of the power supply unit. A conducting rod is rotatably installed through the conducting shell with one end in contact with the mercury or a carbon brush inside the electric brush module and a contact wheel made of conducting materials attached to the other end. Through the contact between the contact wheels and the conducting rings, the positive and negative power is passed onto the upper and lower conducting rings.

The contact power supply unit further includes an elastic connector to couple the electric brush module to the column. It provides a buffering force for the electric brush module to reduce possible vibrations due to the rotation of the display unit. Therefore, the electric brush module can make and maintain tight contact with the upper and lower conducting rings of the display unit through the contact wheel.

The angle encoding unit is mounted between the column and the display unit. An angular position barcode is provided at a proper position on the column. A CCD camera connected to the control unit is provided at a corresponding position on the display unit so that it can detect the angle signal of the display unit by reading the barcode.

The control unit contains at least a microwave receiver and a main control circuit. The microwave receiver receives image signals transmitted wirelessly and sends the signals to the main control circuit. The main control circuit lights up each of the light-emitting modules on the display unit at proper time and space.

DETAILED DESCRIPTION OF THE INVENTION

Figure 1:
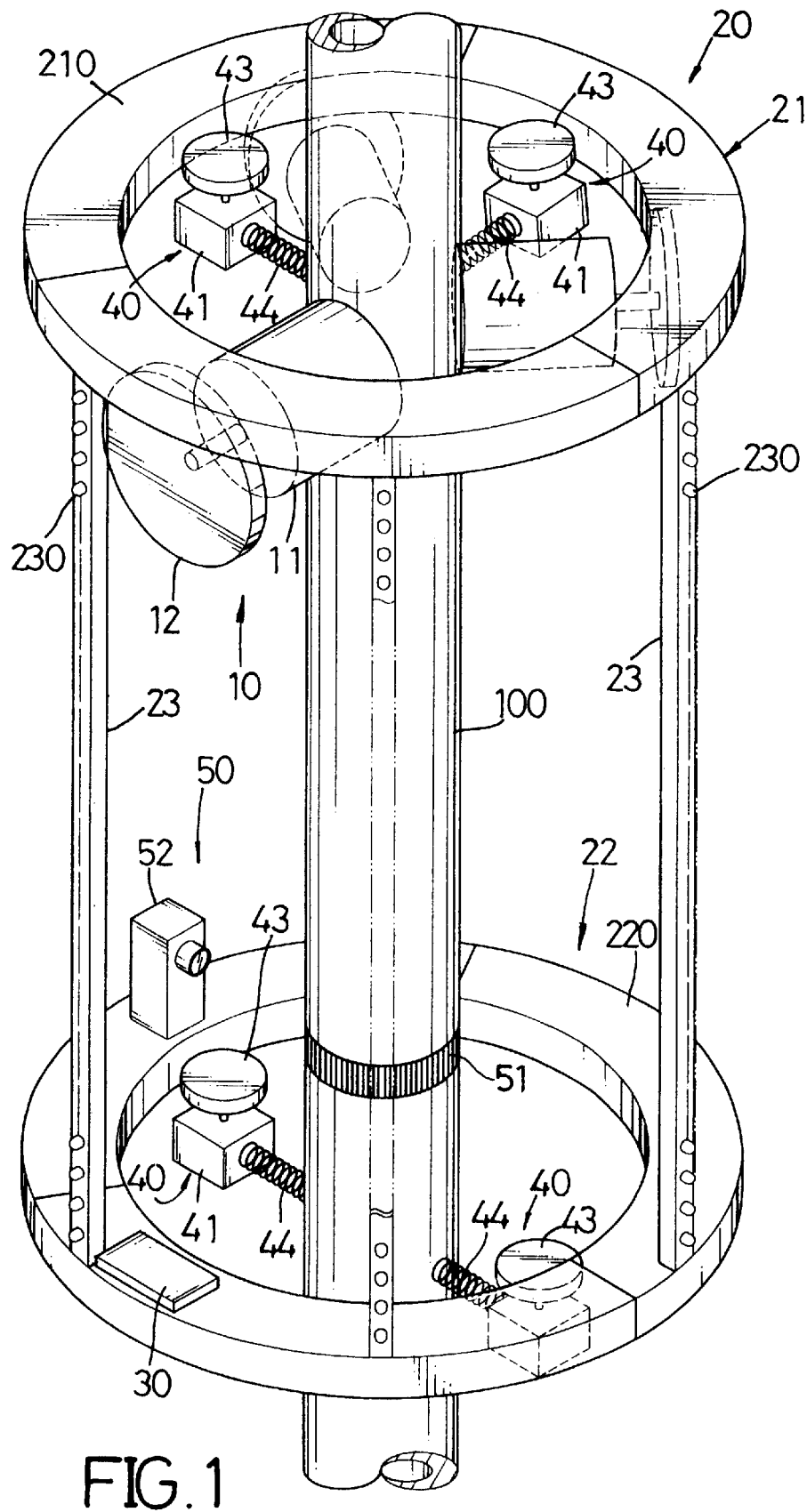
FIG. 1 a perspective view of the rotating display in accordance with the present invention.
Figure 2:
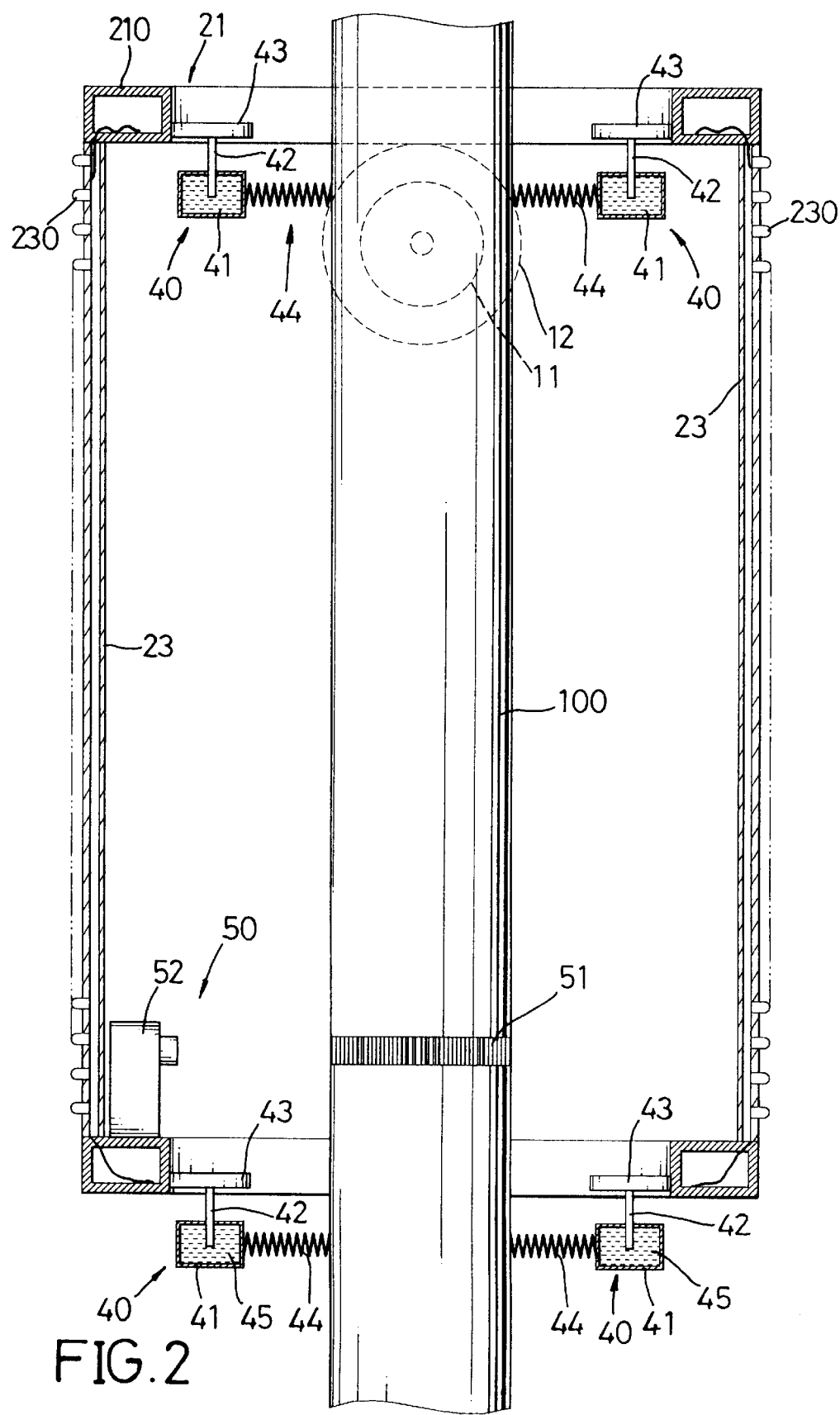
FIG. 2 is a side plan view in partial section of the rotating display in FIG. 1.

With reference to FIGS. 1 and 2, a preferred embodiment of the rotating display in accordance with the present invention comprises a transmission/support mechanism 10, an annular display unit 20, a control unit 30, a contact power supply unit 40 and an angle encoding unit 50. The transmission/support mechanism 10 is installed on a column 100 of a building. The annular display unit 20 is installed around the column 100 and is supported and driven by the transmission support mechanism 10. The control unit 30 provided inside the display unit 20. The contact power supply unit 40 is installed on the column 100 to provide the power needed by the display unit 20 and the control unit 30. The angle encoding unit 50 is installed between the column 100 and the display unit 20 to detect the angular position of the display unit 20.

Figure 3:
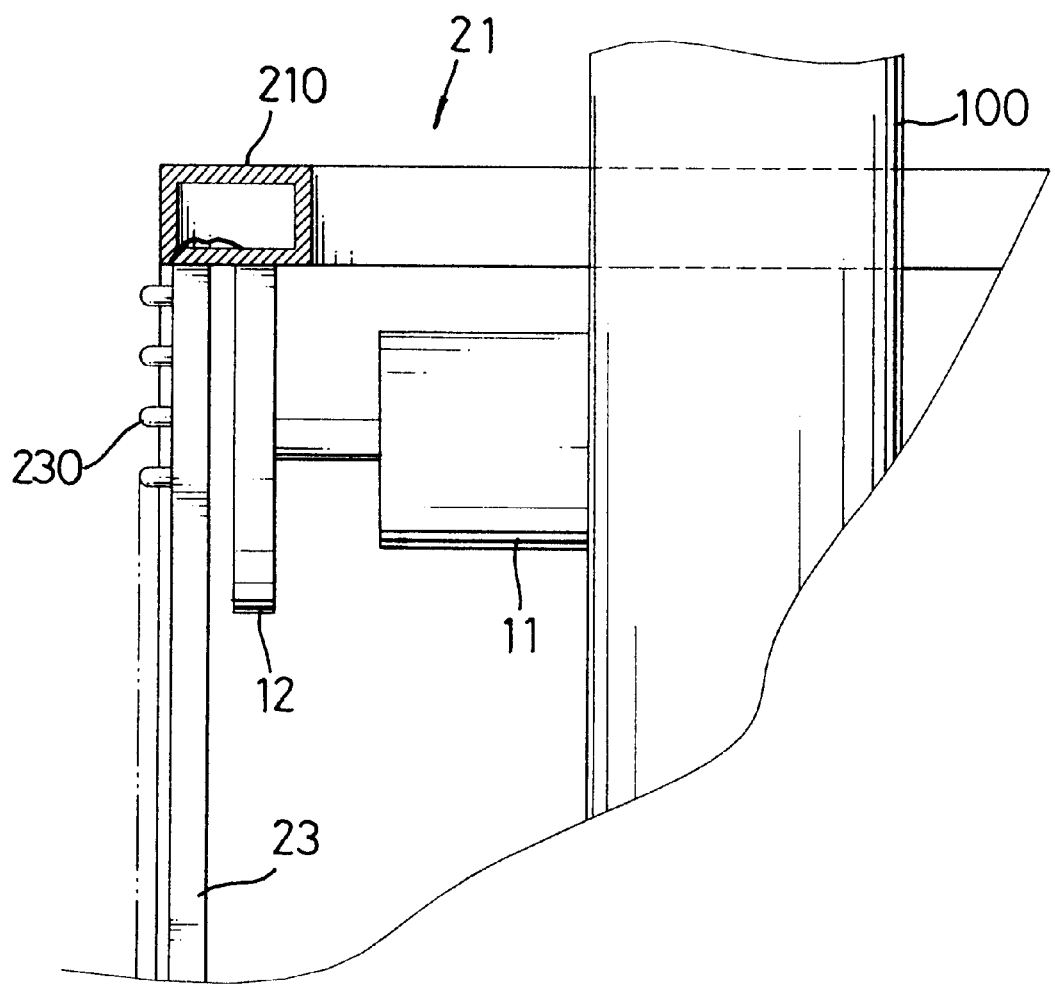
FIG. 3 is an enlarged side plan view in partial section of the top of the rotating display in FIG. 1.
Figure 4:
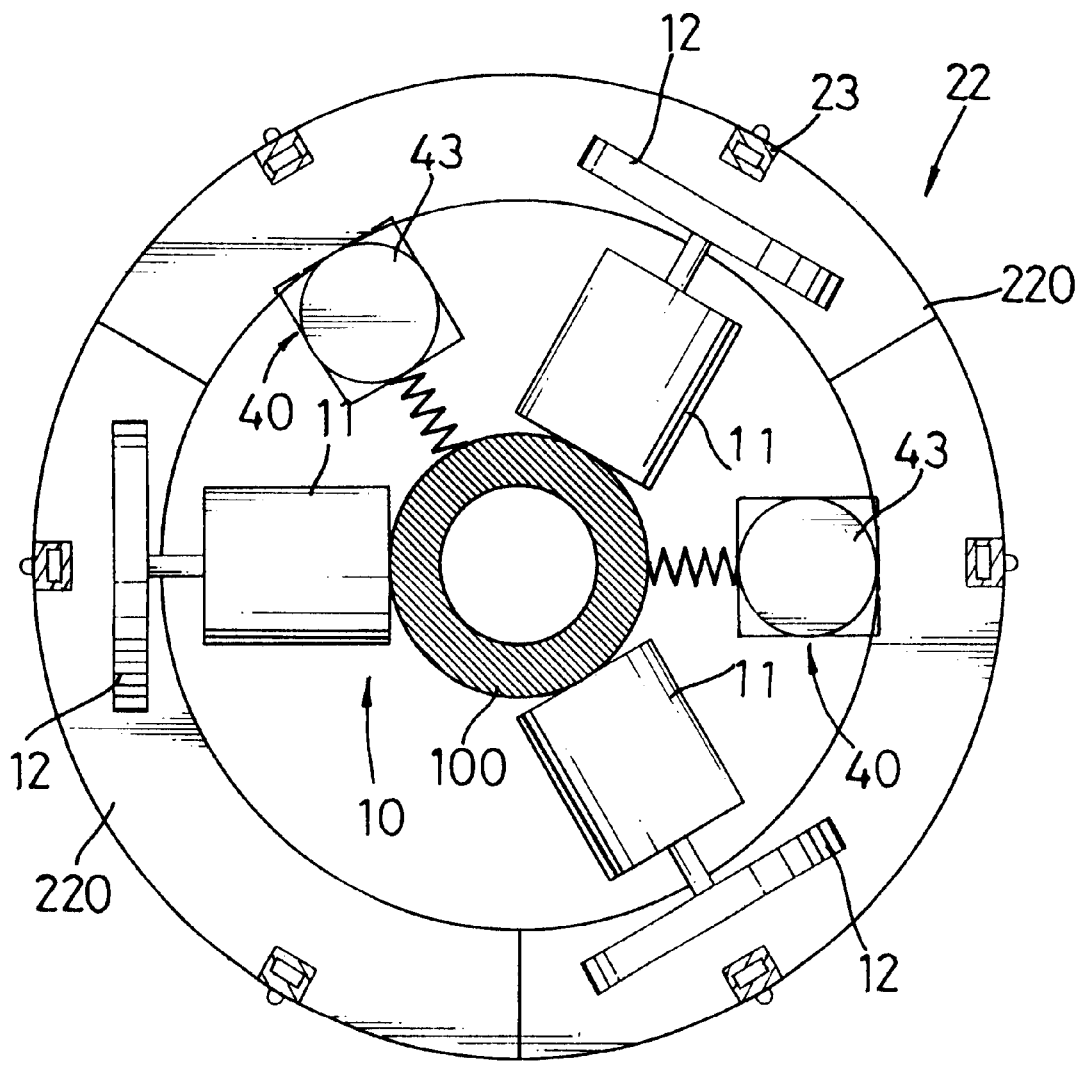
FIG. 4 is a top plan view in partial section of the rotating display in FIG. 1.

The transmission/support mechanism 10 is comprised of three or more than three motors 11. The preferred embodiment uses three motors. Each motor 11 has a rotating shaft, and one end of each motor 11 is attached to the column 100. Each motor 11 shaft extends out radially from the column 100, and a driving wheel 12 is attached to the distant end of the shaft. The driving wheels 12 support the display unit 20 at equal angles as shown in FIGS. 3 and 4.

The display unit 20 is comprised of an upper conducting ring 21, a lower conducting ring 22, and several sets of light-emitting modules 23 mounted vertically between the upper and lower conducting rings 21, 22. The upper conducting ring 21 is supported by the driving wheels 12 in the transmission/support mechanism 10. Each light-emitting module 23 is a long vertical strip with multiple LEDs 230 or equivalent light source devices installed on an outer face of the strip. Each LED 230 closes an electrical circuit between the upper conducting ring 21 and the lower conducting ring 22 and a signal circuit with the control unit 30.

The upper and lower conducting rings 21, 22 of the display 20 are composed of several arcuate sections 210, 220, respectively so the upper and lower conducting rings 21, 22 can be conveniently installed around the column 100 by connecting the arcuate sections 210, 220 together around the column 100. Furthermore, the upper and lower conducting rings 21, 22 are in contact with the contact power supply unit 40 so that the contact power supply unit 40 provides positive and negative power through the upper and lower conducting rings 21, 22, respectively.

Figure 5:
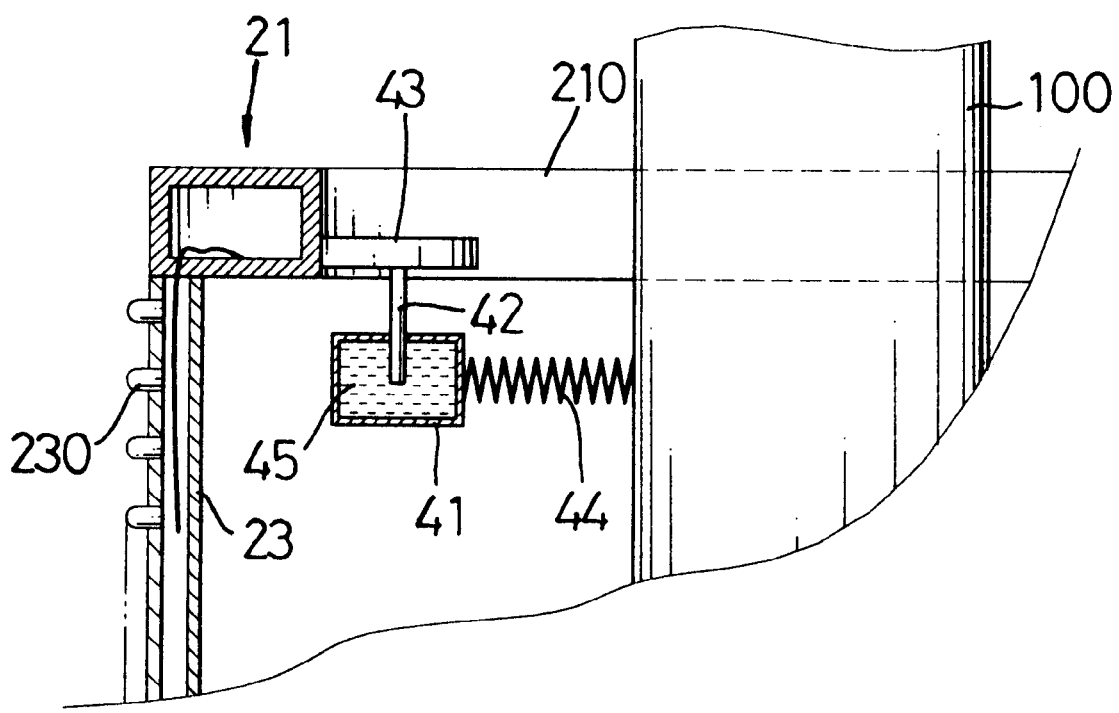
FIG. 5 is a front plan view in partial section of the top of the rotating display in FIG. 2.

As shown in FIGS. 1 and 5, the contact power supply unit 40 is composed of several electric brush modules 41 installed around the column 100 at positions corresponding to the upper and lower portions of display unit 20. In this embodiment, there are two sets of electric brush modules 41 around the upper and lower portions of the column 100. The electric brush module 41 has a conducting shell with mercury or a carbon brush 45 inside. The mercury or a carbon brush is in electrical contact with one pole of a DC power supply.

A conducting rod 42 is rotatably installed in the shell of each electric brush module 41. One end of the conducting rod 42 is in contact with the mercury or a carbon brush inside the electric brush module 41, and a contact wheel 43 made of conducting materials is mounted on the other end. The contact wheel 43 is in tight contact with the upper and lower conducting rings 21, 22 to allow the positive and negative electric power to flow to the upper and lower conducting rings 21, 22, respectively. When the upper and lower conducting rings 21, 22 rotate, the inner sides of the rings 21, 22 are constantly in tight contact with the contact wheels 43 on the electric brush module 41 (FIG. 5).

Since display unit 20 may vibrate when it rotates or not be exactly round, the contact power supply unit 40 further includes an elastic connector 44 to ensure the contact between the contact wheels 43 of the electric brush modules 41 and the upper and lower conducting rings 21, 22. In this embodiment, the elastic connector 44 is a spring connecting the electric brush modules 41 to the column 100. The elastic connector 44 provides a buffering force on the electric brush modules 41 to offset the effects of possible vibrations during the operation of the display unit 20. Therefore, the electric brush modules 41 will make tight contact with the upper and lower conducting rings 21, 22 of the display unit 20.

Figure 6:
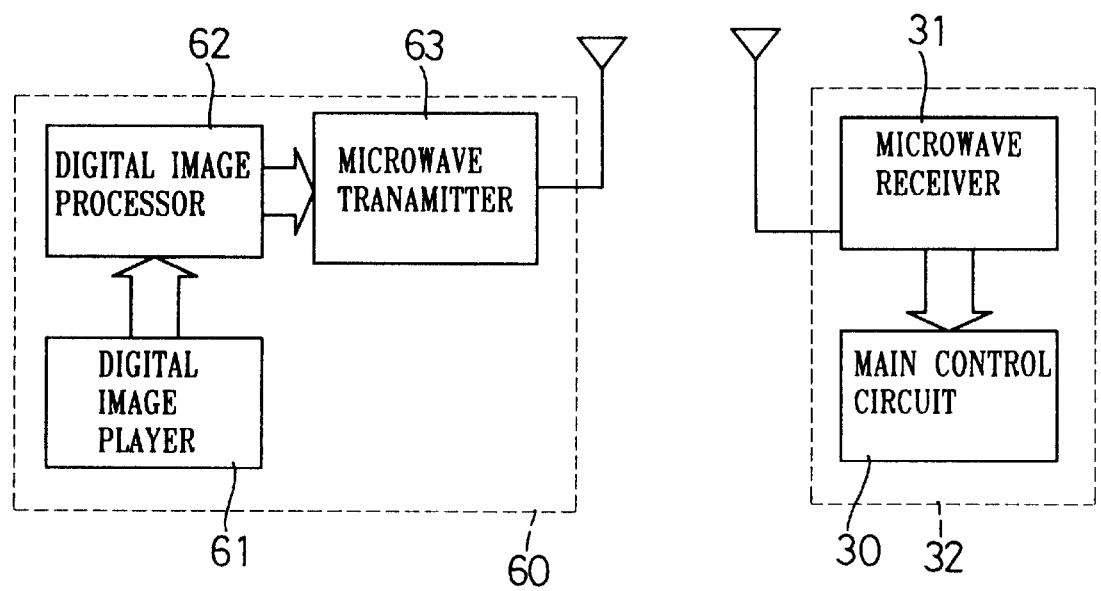
FIG. 6 is a circuit block diagram of the rotating display in FIG. 1.

With reference to FIG. 6, the control unit 30 comprises a microwave receiver 31 and a main control circuit 32. The control unit 30 makes a signal connection with a distant control host 60. The control host 60 is comprised of at least a digital image player 61, a digital image processor 62 and a microwave transmitter 63. When the digital image player 61 sends out digital image signals, the digital image processor 62 performs such jobs as encoding. The microwave transmitter 63 then transmits the signals to the control unit 30.

The control unit 30 uses the microwave receiver 31 to receive the microwave signals sent from the control host 60. The received signals are sent to the main control circuit for processing. They are output to each light-emitting module 23 of the display unit 20, lighting up certain LEDs 230 to form and display the image.

As shown in FIGS. 1 and 2, the angle encoding unit 50 includes a Garay angular position barcode 51 mounted at a proper position around the column 100 and a CCD camera 52 mounted at a proper position on the display unit 20. In the preferred embodiment, the CCD camera 52 is mounted on the lower conducting ring 22 and connects to the main control circuit 32 in the control unit 30. Using the angle position barcode signals 51 sensed by the CCD camera 52, the angular position of the display unit can be detected.

Moreover, a transparent cover (not shown) can be mounted outside the display unit 20 to protect the unit from dust, water and impact by foreign objects.

To operate the rotating display, the motors 11 of the transmission/support mechanism 10 rotate the driving wheels 12 on the motor 11 shafts, which cause the display unit 20 to rotate. The microwave receiver 31 in the control unit 30 receives digital microwave image signals sent from the control host 60. The main control circuit 32 lights up the light-emitting modules 23 on the display unit 20 according to the signals. The CCD camera 52 of the angle encoding unit 50 continuously reads the angular position barcode 51 on the column 100 and provides the angular position signals of the display unit 20 to the control unit 30. The light-emitting modules 23 are then lit up according to the angular position and time sequence of the received image signal. Utilizing the visual persistence in human vision, a 360-degree panoramic image can be produced.

The rotating display in accordance with the present invention includes the following advantages:

1. The rotating display has both decorating and advertising effects. Large-screen displays are mostly commercial advertisement oriented. Using the disclosed surrounding column design, a rotating display can be installed on a cylindrical tower, or any column of a building to decorate the structure.
2. The rotating display is conveniently installed. Since the devices and structure in the invention are already modularized, the invention can be conveniently and efficiently installed.
3. The rotating display uses wireless transmission. Through the wireless controls and signal transmission, the wiring is simplified and the assembly is easier. The probability of failure can also be reduced.

The invention may be varied in many ways by a skilled person in the art. Such variations are not to be regarded as a departure from the spirit and scope of the invention, and all such modifications are intended to be included within the scope of the following claims.

What is claimed is:

1. A rotating display for image display, which comprises:
   a transmission/support mechanism adapted to be installed on a column of a building;
   an annular display unit adapted to be installed around the column, supported and driven by the transmission/support mechanism;
   a control unit provided inside the display unit;
   a contact power supply unit adapted to be installed on the column to provide the power needed by the display unit and the control unit; and
   an angle encoding unit installed between the column and the display unit to detect an angular position signal of the display unit and to send the angular position signal to the control unit;
   wherein image and control signals are transmitted wirelessly to the control unit, thus driving light-emitting units installed on the display unit to display images utilizing the visual persistence in human vision.

2. The rotating display of claim 1 with the display unit having multiple light-emitting modules installed at equal angles between the upper conducting ring and the lower conducting ring, wherein
   the upper and lower conducting rings are in contact with the contact power supply unit so as to pass positive and negative voltages from the contact power supply unit to the display unit; and
   each of the light-emitting modules is a long vertical strip with multiple light-emitting devices comprising LED's, each light-emitting device being installed inside the strip, forming an electrical circuit with the upper conducting ring and the lower conducting ring, and forming a signal circuit with the control unit.

3. The rotating display of claim 2, wherein the upper conducting ring and the lower conducting ring are composed of multiple arcuate sections so the upper conducting ring and the lower conducting ring are able to be adapted to be conveniently mounted around the column.

4. The rotating display of claim 1, wherein the transmission/support mechanism consists of at least three motors, each of which is adapted to be attached to the column with its shaft pointing radially out and a driving wheel attached to the end of the shaft, the driving wheels supporting the display unit so that when the motors operate, the driving wheels rotate the display unit around the column.

5. The rotating display of claim 1 with the contact power supply unit composed of at least one set of electric brush module adapted to be installed on the column at the top and bottom of the display unit, wherein each electric brush module comprises:
   a conducting shell with mercury or a carbon brush inside and connects to one pole of the power supply unit, and
   a conducting rod rotatably installed on the electric brush module with a first end in contact with the mercury or a carbon brush inside the electric brush module and a contact wheel made of conducting materials attached to a second end so that through the contact between the contact wheels and the upper and lower conducting rings, the positive and negative voltages are passed to the upper and lower conducting rings.

6. The rotating display of claim 1, wherein the contact power supply unit further comprises an elastic connector, which attaches the at least one electric brush module to the column so as to ensure tight contact between the electric brush modules and the upper and lower conducting rings.

7. The rotating display of claim 1, wherein the angle encoding unit is provided between the column and the display unit, an angular position barcode is provided at a proper position around the column, a CCD camera connected with the control unit is provided at the corresponding position on the display unit so that the CCD camera detects the angular position signal of the display unit by reading the angular position barcode.

8. The rotating display of claim 1 with the control unit comprising a microwave receiver and a main control circuit, wherein the microwave receiver receives image signals transmitted wirelessly and sends the signals to the main control circuit, and the main control circuit lights up each of the light-emitting modules on the display unit according to the angular position and time sequence of the received image signal.

* * * * *